US008886000B2

(12) United States Patent
Register, III et al.

(10) Patent No.: US 8,886,000 B2
(45) Date of Patent: Nov. 11, 2014

(54) HYBRID FIBER-OPTIC CABLE

(71) Applicants: James Arthur Register, III, Hickory, NC (US); David Henry Smith, Hickory, NC (US)

(72) Inventors: James Arthur Register, III, Hickory, NC (US); David Henry Smith, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 103 days.

(21) Appl. No.: 13/760,648

(22) Filed: Feb. 6, 2013

(65) Prior Publication Data

US 2014/0064680 A1  Mar. 6, 2014

Related U.S. Application Data

(60) Provisional application No. 61/697,015, filed on Sep. 5, 2012.

(51) Int. Cl.
*G02B 6/44* (2006.01)

(52) U.S. Cl.
CPC ............ *G02B 6/4415* (2013.01); *G02B 6/4413* (2013.01); *G02B 6/4416* (2013.01)
USPC ........... 385/101; 385/102; 385/103; 385/104; 385/105; 385/106

(58) Field of Classification Search
USPC ......... 385/100, 101, 102, 103, 104, 105, 106, 385/107
See application file for complete search history.

(56) References Cited

U.S. PATENT DOCUMENTS

| 5,325,457 A | 6/1994 | Bottoms, Jr. et al. .......... 385/113 |
| 5,651,081 A | 7/1997 | Blew et al. ..................... 385/101 |

(Continued)

FOREIGN PATENT DOCUMENTS

| CN | 102222546 A | 10/2011 | ............. H01B 11/22 |
| CN | 202067602 U | 12/2011 | ............. H01B 11/22 |
| CN | 202093884 U | 12/2011 | ............. H01B 11/22 |
| CN | 202134260 U | 2/2012 | ............... H01B 9/00 |

OTHER PUBLICATIONS

Nexans, "Outdoor hybrid cables (unshielded)," Retrieved on Jun. 23, 2014 from http://www.nexans.fr/eservice/France-en/pdf-family_9444/Outdoor_hybrid_cables_unshielded_.pdf—3 pages.

D.L. Collado, B.G. Risch, D.J. Yamasaki, J.D. Gustitus, & J.R. Sach, "Technical Considerations for Composite Cables in Fiber-To-The-Antenna (FTTA) Applications," Copyright 2013, *Proceedings of the 62nd International Wire & Cable Symposium Conference*, pp. 670-678; Retrieved on Jun. 20, 2014; Available at http://iwcs.omnibooksonline.com/data/papers/2013/14-1.pdf.

(Continued)

*Primary Examiner* — Jennifer Doan

(57) ABSTRACT

A hybrid cable includes a cable jacket and elements stranded within the cable jacket. The elements include greater-capacity electrical-conductor elements and sub-assembly elements. The greater-capacity electrical-conductor elements include a metallic conductor jacketed in a polymer, each within the range of 10 American wire gauge (AWG) to 1\0 AWG. The sub-assembly elements include stranded combinations of sub-elements, where the sub-elements include at least one of polymeric tubes comprising optical fibers and lesser-capacity electrical-conductor elements, each having a lesser current-carrying capacity than 10 AWG. The sub-elements are stranded with respect to one another and additionally stranded as part of sub-assembly elements with respect to other elements.

20 Claims, 2 Drawing Sheets

(56) References Cited

U.S. PATENT DOCUMENTS

| | | | |
|---|---|---|---|
| 5,917,977 A | 6/1999 | Barrett | 385/101 |
| 6,195,487 B1 | 2/2001 | Anderson et al. | 385/101 |
| 6,236,789 B1 | 5/2001 | Fitz | 385/101 |
| 6,349,161 B1 * | 2/2002 | Gleason et al. | 385/113 |
| 6,738,547 B2 | 5/2004 | Spooner | 385/101 |
| 7,310,430 B1 * | 12/2007 | Mallya et al. | 382/101 |
| 7,643,713 B2 | 1/2010 | Büthe et al. | 385/101 |
| 8,285,095 B2 | 10/2012 | Han et al. | 385/101 |
| 2002/0001441 A1 | 1/2002 | Avellanet | 385/104 |
| 2008/0037941 A1 | 2/2008 | Mallya et al. | 385/101 |
| 2012/0008904 A1 | 1/2012 | Han et al. | 385/101 |
| 2012/0281953 A1 | 11/2012 | Choi et al. | 385/101 |
| 2013/0287348 A1 | 10/2013 | Register, III et al. | 385/101 |
| 2014/0064681 A1 | 3/2014 | Register, III et al. | 385/101 |

OTHER PUBLICATIONS

Draka, "ezMOBILITY™ Solutions," Copyright 2011, pp. 1-4; Retrieved on Jun. 20, 2014; Available at http://www.truenorthtech.com/pdf/ezMOBILITY%20Brochure.pdf.

Draka & Prysmian, "4G Hybrid Cable: Solution for FTTA Wireless Applications," Copyright 2014, pp. 1-2; Retrieved on Jun. 20, 2014; Available at http://na.prysmiangroup.com/en/business_markets/markets/telecom-solutions/resources/datasheets/500D_DS303_4G_FTTA_WIRELESS_0514.pdf.

* cited by examiner

US 8,886,000 B2

HYBRID FIBER-OPTIC CABLE

RELATED APPLICATIONS

This application claims the benefit of priority under 35 U.S.C. §119 of U.S. Provisional Application Ser. No. 61/697,015 filed on Sep. 5, 2012, the content of which is relied upon and incorporated herein by reference in its entirety.

BACKGROUND

Aspects of the present disclosure relate generally to hybrid cables that include both fiber-optic and conductor elements, which may be stranded together for use in fiber-to-the-antenna (FTTA) type applications.

Cellular service providers may deploy Remote Radio Head (RRH) solutions throughout their antenna networks, a process that involves locating power radio frequency (RF) amplifiers at the top of the antenna (e.g., cell tower; radio tower; cell site). Remote Radio Head (RRH) solutions accordingly require cabling arrangements that deliver both power for the amplifiers and the high bandwidth capabilities of a fiber cable. Handling and routing of multiple cables, such as separate power cables and fiber optic cables, may be cumbersome, and may result in redundant armoring and jacketing as well as wasted space in ducts or other routing guides between the base and top of an antenna tower. A need exists for a hybrid cable arrangement that combines electrical conductors with fiber optic cables under a single cable jacket in a space-efficient manner, while still providing low attenuation of the optical fibers carried by the optical elements of the cable.

SUMMARY

One embodiment relates to a hybrid cable, which includes a cable jacket and elements stranded within the cable jacket. The elements include greater-capacity electrical-conductor elements and sub-assembly elements. The greater-capacity electrical-conductor elements include a metallic conductor jacketed in a polymer, each within the range of 10 American wire gauge (AWG) to 1\0 AWG. The sub-assembly elements include stranded combinations of sub-elements, where the sub-elements include at least one of polymeric tubes comprising optical fibers and lesser-capacity electrical-conductor elements, each having a lesser current-carrying capacity than 10 AWG. The sub-elements are stranded with respect to one another and additionally stranded as part of sub-assembly elements with respect to other elements.

Another embodiment relates to a hybrid cable, which includes a cable jacket and elements stranded within the cable jacket. The elements include greater-capacity electrical-conductor elements, including a metallic conductor jacketed in a polymer, and sub-assembly elements. The sub-assembly elements include stranded combinations of sub-elements, wherein the sub-elements include of at least one of polymeric tubes including optical fibers and lesser-capacity electrical-conductor elements. The lesser-capacity electrical-conductor elements include a metallic conductor jacketed in a polymer, each having a lesser current-carrying capacity than the greater-capacity electrical-conductor elements. The sub-elements of the sub-assembly elements spiral within a circle defined by the outermost edge of the spiral. The greater-capacity electrical-conductor elements are round and the diameter of the circle defined by the outermost edge of the spiral is within 15% of the diameter of the largest one of the greater-capacity electrical-conductor elements.

Yet another embodiment relates to a hybrid cable, which includes a cable jacket and elements stranded within the cable jacket. The elements include one or more fiber-optic elements, including optical fibers within a polymeric tube, and electrical-conductor elements including a metallic conductor jacketed in a polymer. The electrical-conductor elements include greater-capacity electrical-conductor elements and lesser-capacity electrical-conductor elements, where the lesser-capacity electrical-conductor elements are stranded and spiral within a circle defined by the outermost edge of the spiral. The greater-capacity electrical-conductor elements are round and the diameter of the circle defined by the outermost edge of the spiral is within 15% of the diameter of the largest one of the greater-capacity electrical-conductor elements. At least six of the elements are stranded around a central element and the at least six of the elements are round in cross-section and have a diameter that is within 15% of the diameter of the largest one of the diameters of the at least six of the elements.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present innovations and inventions is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Hybrid cables (e.g., cables of FIGS. 1-2 disclosed herein) include electric-conductor and fiber-optic elements stranded (e.g., helically wound) for enhanced performance of associated optical fibers as well as overall cable flexibility, where some of the electric-conductor elements are relatively-high capacity conductors ranging from 10 AWG to 1/0 AWG (i.e., about 5.26-53.5 mm$^2$ area, about 2.588-8.252 mm diameter, about 3.86-1.21 turns of wire per cm, and about 3.277-0.3224 Ω/km for stranded wires, or the equivalent). Typically such heavy conductors may not be stranded due to the associated forces required to bend and constrain the conductors, and/or because stranding adds length, increasing cable manufacturing expenses due to material costs (e.g., copper conductors).

However, Applicants have found that stranding the fiber optic subunits with the conductors provides a robust hybrid cable, with improved data transmission via less attenuation of the optical fibers. Others of the electric-conductor elements are of a lesser current-carrying capacity, such as conductors greater than 10 AWG (e.g., between 12-24 AWG; 18 AWG). The lesser-capacity electric-conductor elements are stranded with one another to form a wound spiral having dimensions roughly the same as the greater-capacity electric conductor elements (e.g., within 15% largest cross-sectional dimensions) so that the greater-capacity electric conductor elements may be stranded with the stranded groups of lesser-capacity electric conductor elements and fiber-optic elements in an efficient and stable manner.

Aspects of the present disclosure relate to the placement and size of the individual stranded elements of the hybrid cables in order to improve the cost, size, and data-transmission performance of the cable. Stable hybrid cable cores, due to stranding as well as the placement and size of the stranded elements as disclosed herein, also contribute to improved long-term performance, weather-ability, and stability of the cable due to enhanced mechanical coupling between the stranded elements.

Figure 1:
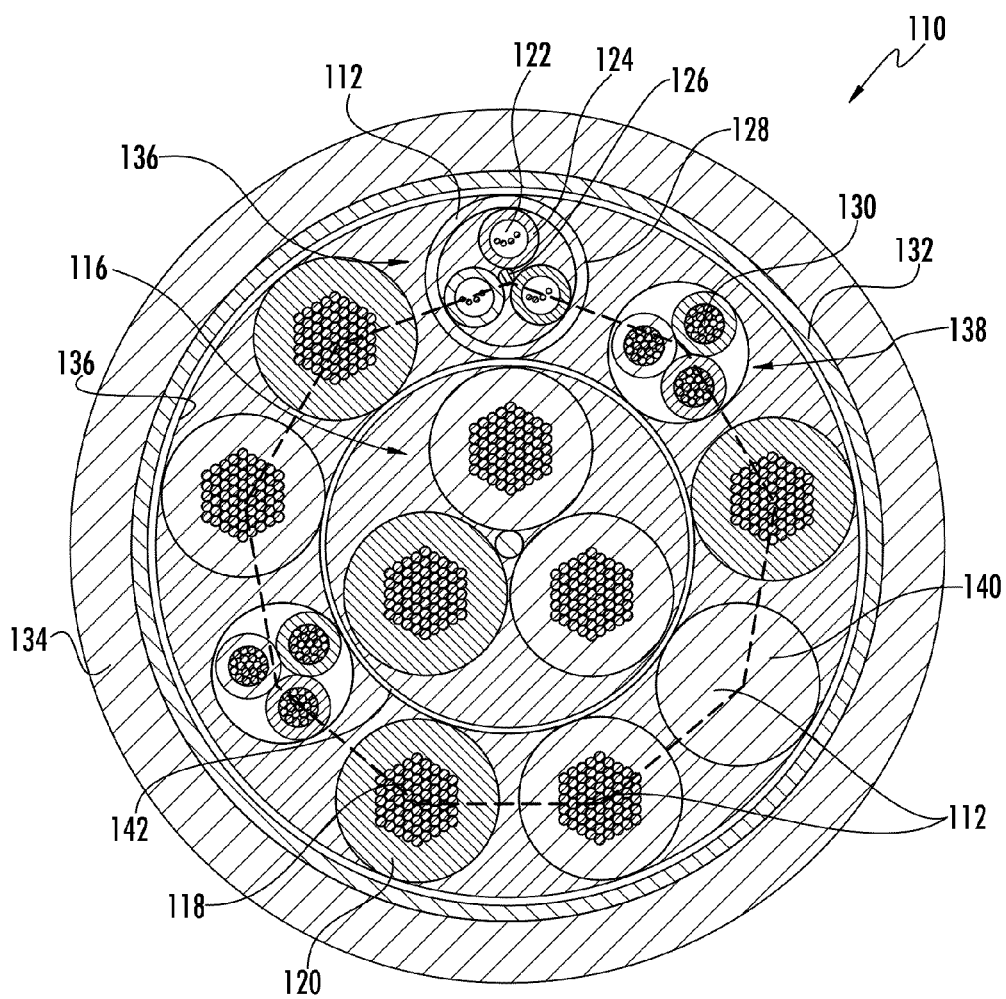
FIG. 1 is a sectional view of a hybrid cable according to an exemplary embodiment.

Referring to FIG. 1, a hybrid cable 110 includes elements 112, 114 stranded around a central element 116. The elements 112, 114 include stranded copper conductors 118 (e.g., 8 AWG) insulated in polyvinyl chloride (PVC) jackets 120 (or another polymeric material, such as fire-retardant (FR) polyethylene (PE)) and fiber optic element(s) 136. In some embodiments, the diameter of the cable 110 (i.e., outer diameter of the radial cross-section, as shown in FIG. 1) is less than 20 min due to the efficient arrangement of internal cable components, but may also be greater than 10 mm.

The central element 116 (e.g., central member(s)) of the cable 110 provides a surface for stranding the elements 112, 114. In some embodiments, the central element 116 is a single body (e.g., stranded copper conductor 118 or fiber-optic element 136), while in other embodiments the central element 116 includes multiple components, such as conductive elements 118 stranded together. The fiber-optic element 136, in some embodiments, includes optical fibers 122 in buffer tubes 124 stranded about a rod 126 within a polymeric tube 128 (e.g., outdoor-rated PVC jacket). According to an exemplary embodiment, aramid yarn or other strength members may be included within the tube 128. The cable may also include elements 112, 114 in the form of filler rods 140 (e.g., solid polymeric rods)

Figure 2:
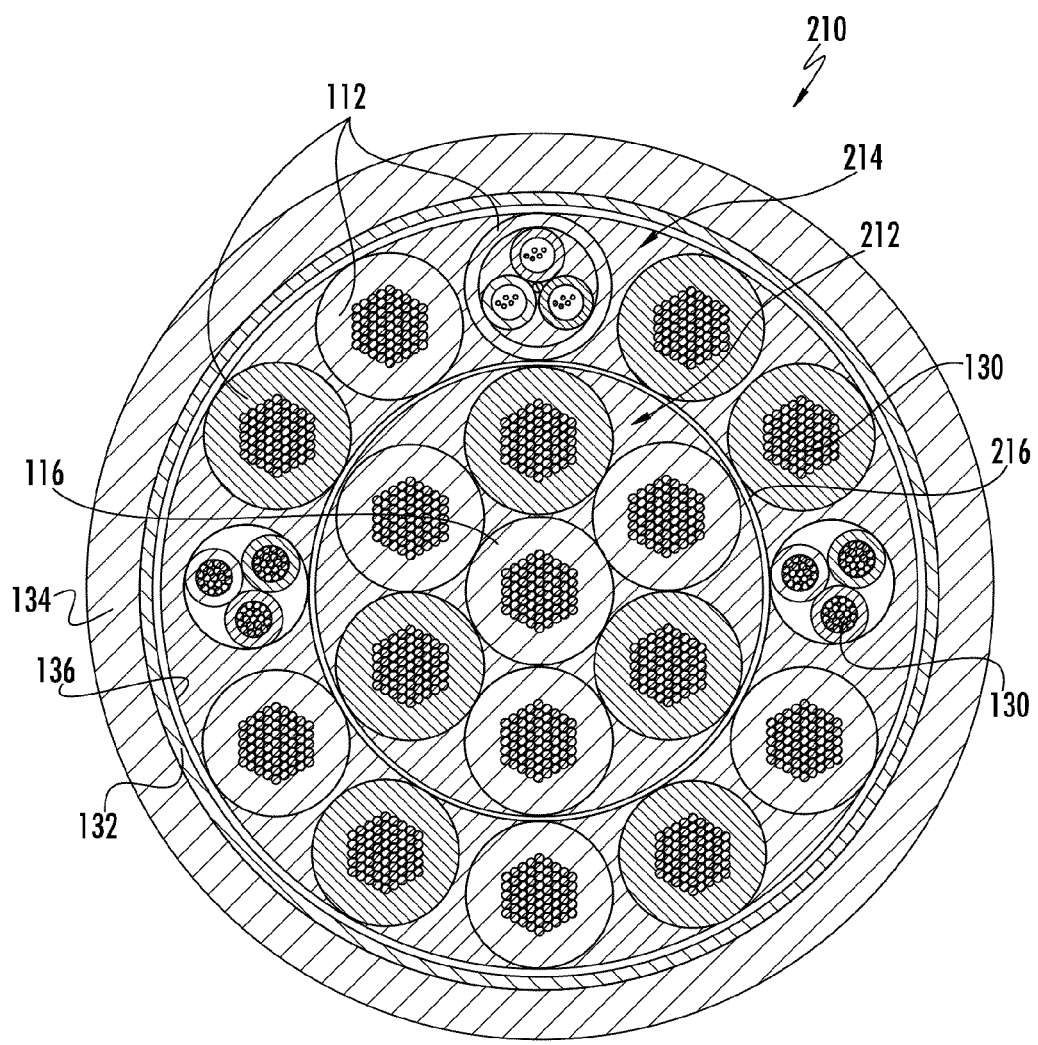
FIG. 2 is a sectional view of a hybrid cable according to another exemplary embodiment.

Lesser-capacity conductors 130 (e.g., alarm wires) may be positioned in the interstitial spaces between stranded elements 112, 114. Alternatively, as shown in FIGS. 1-2, lesser-capacity conductors 130 may be stranded together and stranded as a sub-assembly element 138 with the other elements 112, 114. According to an exemplary embodiment, the lesser-capacity conductors 130 include 18 AWG conductors, which may carry an alarm signal; such as if connected antenna hardware requires maintenance. The lesser-capacity conductors 130 may carry other signals instead or in addition thereto. In various embodiments, the conductors 118 are relatively high-capacity conductors, in the range of 10 AWG to 1\0 AWG (e.g., 8 gauge, 6 gauge), providing a large electrical capacity for powerful electrical equipment (e.g., cell site, radar, FTTA applications), as well as providing axial strength to the cable 110.

In some embodiments, armor 132 surrounds the stranded elements 112, 114. According to an exemplary embodiment, the armor 132 may be a corrugated steel, copper, or aluminum armor, which also serves as a ground conductor and/or an electro-magnetic interference (EMI) shield. In other embodiments, the armor 132 may be dielectric. Exterior to the armor 132, the cable 110 of FIG. 1 includes a polymeric jacket 134 (e.g., polyethylene, flare-retardant polyvinyl chloride, medium density polyethylene, zero-halogen polymer, outdoor polyvinyl chloride).

Aspects of the present disclosure relate to the particular efficient placements and uses of the stranded elements 112, 114, 136, 138 and structure of the cable 110, as opposed to the general concept of a hybrid cable containing both optical fibers and conductors. For example, stranding of the elements 112, 114, 136, 138 of about the same size as one another and in close proximity to one another, as disclosed herein, may provide for improved cable 110 flexibility, as well as improved performance of the optical fibers 122 (e.g., less attenuation than un-stranded cables).

According to an exemplary embodiment, spacing between stranded elements 112, 114, 136, 138 positioned adjacent to the central element 116 (e.g., contacting, within 10 microns of), is designed to provide a robust cable structure. According to an exemplary embodiment, a polygon (see dashed hexagon in FIG. 1) may be defined as passing through the centers of adjoining elements 112, 114, stranded about the central element 116. The exteriors of the elements 112, 114, 136, 138 are spaced apart from one another at the narrowest distance by an average distance of separation of at least 2% of the total periphery of the polygon, but less than 20% of the periphery (i.e., gap or spacing between stranded elements is between 2-20%), preferably less than 15%, such as 12% or less; where 'average' distance refers to the net space of all gaps between adjoining stranded elements 112, 114, 136, 138 divided by the total number of adjoining stranded elements (such as all nine elements 112, 114 around the central element 116 as shown in FIG. 1). Such spacing provides for enough room to account for inaccuracies in tolerances of the sizing of the elements (e.g., subtle changes in diameter) so that the stranded elements 112, 114, 138 fit easily together, without radially loading one another; as well as provides for stable positioning, reducing the ability of the stranded elements 112, 114, 136, 138 to shift or migrate within the jacket 134, especially when the cable 110 is bending.

The cable 110 of FIG. 1 may further include one or more fiber-optic elements 136 and electrical-conductor elements 118 in the insulator jacket 120 (e.g., dielectric, PVC) stranded about the central element 116, with a water blocking yarn 142 therebetween. The optical fibers 122 are contained in the jacket or tube 128 (e.g., the tube mostly consisting of medium density polyethylene or polyvinyl chloride). Exterior to the stranded elements 112, 114, 136, 138 the cable 110 includes a water-blocking tape 136, surrounded by the armor 132, in turn surrounded by a polymeric jacket 134.

According to an exemplary embodiment, a hybrid cable 110 includes at least six electrical-conductor elements 118 stranded about a central element 116, which may be or include a fiber optic element 136. In some such embodiments or alternative embodiments, the central element 116 is or includes an electrical-conductor element 118, 138.

According to an exemplary embodiment, the elements 112, 114, 136, 138 of FIG. 1 share a common diameter or maximum radial cross-section dimension (e.g., within reasonable tolerances; e.g., within 10% of one another). According to an exemplary embodiment, the tube 128, containing optic fibers 122 and stranded about the central element 116, has a diameter within a range of +10% to −20% of the diameter shared by the adjoining electrical conductor elements 118, 138. Sizing the elements 112, 114, 136, 138, 116, and especially the stranded elements 112, 114, 136, 138, to match one another, improves the robustness of the hybrid cable 110 by reducing the volume of interstitial space within the cable 110, and correspondingly reducing the volume of space available for migration of the stranded elements 112, 114, 136, 138.

Referring now to FIG. 2, a hybrid fiber optic cable 210 includes first and second layers 212, 214 of stranded elements 112, 114. The first layer 212 of stranded elements 112 are stranded about a central member 116 (e.g., electrical-conductive element 118, fiber-optic element 136, glass-reinforced plastic rod, filler rod, stranded combination of elements). Surrounding the first layer 212, a water-swellable tape and/or a binder 216 at least partially fills the interstitial space. The second layer 214 includes additional stranded elements 112, 114. According to an exemplary embodiment, the second layer 214 includes more stranded elements 112, 114 than the first layer 212. In other contemplated embodiments, a third layer correspondingly includes still more elements 112, 114 than the second layer 214, and so forth. The fiber-optic elements 136 may be positioned in the exterior-most layer (e.g., layer 214), providing ease of access thereto when opening the cable 210.

According to an exemplary embodiment, the lay length of the stranded elements 112, 114 of cable 210, and/or any of the other cables disclosed herein, is between 350-450 mm, providing a good empirically-derived balance between element length, cable flexibility, and low-attenuation of optical fibers. Further, the second layer 214 is stranded in an opposite direction to the first layer 212 (or mostly so for S-Z stranding of either or both layers), which avoids interstitial conversion of the layers 212, 214 that may increase attenuation due to extra bending of optical fibers carried in the fiber-optic elements 114. The optical fibers 122 may be multi-mode fibers, but single-mode fibers may also or alternatively be included. Furthermore, the optical fibers 122 may be loosely placed in buffer tubes (as shown in FIGS. 1-2), tight-buffered, or even a ribbon or stacked ribbons of optical fibers.

According to an exemplary embodiment, the cable 210 is greater than 30 mm in diameter, but less than 40 mm in diameter due to the compact configuration of stranded elements 112, 114; and includes sixteen higher-gauge AWG conductors (e.g., 6 AWG), as well as three 12-fiber buffer tubes 124 and six lower-gauge conductors 130 (e.g., 18 AWG). According to an exemplary embodiment, water-blocking tape 136, armor 132, and a polymeric jacket 134 surround the second layer 214. Filler rods may be positioned within the interstitial spaces surrounding the first layer 212, above or below the tape and/or binder 216.

According to an exemplary embodiment, cables 110, 210 include a number of greater-capacity electrical-conductor elements 118 (e.g., ten or six 6-guage thermoplastic high heat-resistant nylon-coated (THHN) conductors) having a diameter (e.g., less than 7 mm diameter; about 6.3 mm diameter) that is approximately equal to that diameter of a number of fiber optic elements 136 also included in the cable. According to an exemplary embodiment, the difference in diameters of the stranded elements 112, 114, 136, 138 is less than 50% of the diameter of the largest of the diameters (e.g., less than 25%, less than 10%), or less than twice the diameter of the smallest of the diameters (e.g., less than 1.5 times; less than 1.25 times). In some embodiments, the fiber optic elements 136 contain multiple optical fibers, such as 36 or 24 fibers net. Standard THHN 6-guage copper conductors have diameters nearly matching those of standard-size buffer tubes of 12-fiber MIC® Cables manufactured by Corning Cable Systems, which may serve as the electrical-conductor and fiber-optic elements 118, 136 respectively. In other embodiments, machine tool wire (MTW) (more insulated than THHN) conductors may be used.

Closely sizing the electrical-conductor and fiber-optic elements 118, 136 provides for a uniform shape and well-balanced, stranded cable 110, 210, which in turn improves the performance of the associated optical fibers 122. According to an exemplary embodiment, single-mode optical fibers of the cables 110, 210 shown in FIGS. 1-2 or variations thereof, have an attenuation of 0.4 dB/km (or less) for 1310 nm wavelength and of 0.3 dB/km (or less) for 1550 nm wavelength in the stranded configuration of the respective cables 110, 210. Such low attenuation is believed to be a significant improvement over hybrid cables that are un-stranded, particularly when the cables are in bending. In other embodiments, the hybrid cables 110, 210 may include multi-mode fibers and/or multi-core fibers.

In some embodiments, the stranded elements 112, 114 are helically stranded, while in other embodiments the elements are S-Z stranded (or a combination thereof, between different layers 212, 214). Preferably, the larger diameter elements 112 (e.g., 2 AWG or 1/0 AWG THHN or MTW) for larger cables (e.g., at least 30 mm in diameter) are helically stranded, due at least in part to reduced lateral loading by the elements 112 upon the jacket 134 within the cable 110, 210, which allows for a thinner jacket 134. Other embodiments may be S-Z stranded, especially those of smaller diameters (e.g., less than 30 mm in diameter) and associated components.

Applicants have discovered that sizing the diameters of the fiber-optic elements 136 to be close in size to that of the electrical-conductor elements 118 allows for improved stranding of both elements about the central element 116. In a preferred embodiment, the stranded elements 112, 114 are stranded in groups of about seven mod six (e.g., 7, 13, 19, 25, ... with one of the elements in the center) or one mod five, which allows for a generally even distribution of the elements about the central element 116, with reduced shifting or asymmetry to the position of the elements 112, 114 in the cable 110, 210. In some embodiments, multiple layers 212, 214 of stranded elements 112, 114 are included in the cable 210, where the outer layers 214 are stranded about the inner layer(s) 212, and where the innermost layer 212 may be stranded about a central element 116 (e.g., spacer, guide).

Utilizing the described hybrid cable design features and design rules offers a number of advantages, including: (1) stable cable cores that allow for enhanced mechanical coupling between the cable elements, which should offer an improvement in long term cable stability in its installation environment; (2) the above-described features and techniques generally allow for a minimum-size cable cross-section, while containing the requisite stranded elements, where smaller cables are less expensive to make—particularly when considering the cost of an overall armor/shield; and (3) data transmission via optical performance will be improved relative to cables that do not include stranded elements, particularly around bends in the cable due at least in part to reduced tension of the optical fibers. Further, use of either an optical element 136 or an electrical-conductive element 118, 138 as the central element 116 further condenses the cable 110, 210, improving efficiency of space, where the electrical conductive elements 112 and/or armor 132 (which may not be included in some embodiments) additionally serve as strength members for the cable in tension or compression.

The construction and arrangements of the hybrid cable, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, sub-assemblies, such as elements 136, 138 may include a combination of fiber-optic and electrically-conductive sub-elements that are stranded together, such as two buffer tubes with optical fibers stranded with one 18 AWG conductor, or two conductors with one buffer tube. Also, the sub-assemblies may include numbers other than three sub-elements, such as two, four, five, six, seven, etc. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present innovations and inventions.

What is claimed is:

1. A hybrid cable, comprising:
  a cable jacket;
  elements stranded within the cable jacket, wherein the elements comprise:
    greater-capacity electrical-conductor elements comprising a metallic conductor jacketed in a polymer, wherein the greater-capacity electrical-conductor elements are each within the range of 10 American wire gauge (AWG) to 1\0 AWG; and
    sub-assembly elements comprising stranded combinations of sub-elements, wherein the sub-elements comprise at least one of:
      polymeric tubes comprising optical fibers; and
      lesser-capacity electrical-conductor elements comprising a metallic conductor jacketed in a polymer, wherein the lesser-capacity electrical-conductor elements each have a lesser current-carrying capacity than 10 AWG;
    whereby the sub-elements are stranded with respect to one another and additionally stranded, as part of the sub-assembly elements, with respect to others of the elements.

2. The hybrid cable of claim 1, wherein at least six of the elements are stranded side-by-side with one another around a central element.

3. The hybrid cable of claim 2, wherein the central element comprises at least one of the greater-capacity electrical-conductor elements, the lesser-capacity electrical-conductor elements, and the polymeric tubes comprising optical fibers.

4. The hybrid cable of claim 2, wherein the central element comprises at least one of a steel strength member and a dielectric strength member comprising tensile fibers embedded in a cured-resin matrix.

5. The hybrid cable of claim 1, further comprising armor between the elements and the cable jacket, wherein the armor is configured to provide electro-magnetic interference shielding and grounding as well as crush and impact resistance for the hybrid cable.

6. A hybrid cable, comprising:
  a cable jacket;
  elements stranded within the cable jacket, wherein the elements comprise:
    greater-capacity electrical-conductor elements comprising a metallic conductor jacketed in a polymer; and
    sub-assembly elements comprising stranded combinations of sub-elements, wherein the sub-elements comprise of at least one of:
      polymeric tubes comprising optical fibers; and
      lesser-capacity electrical-conductor elements comprising a metallic conductor jacketed in a polymer, wherein the lesser-capacity electrical-conductor elements each have a lesser current-carrying capacity than the greater-capacity electrical-conductor elements;
    wherein the sub-elements of the sub-assembly elements spiral lengthwise within a circle defined by the outermost edge of the spiral, and wherein the greater-capacity electrical-conductor elements are round in cross-section and the diameter of the circle is within 15% of the diameter of the largest one of the greater-capacity electrical-conductor elements.

7. The hybrid cable of claim 6, wherein a first sub-assembly element includes stranded lesser-capacity electrical-conductor elements without the polymeric tubes comprising optical fibers.

8. The hybrid cable of claim 7, wherein a second sub-assembly element includes stranded polymeric tubes comprising optical fibers without the lesser-capacity electrical-conductor elements.

9. The hybrid cable of claim 8, wherein the polymeric tubes of the second sub-assembly element are stranded about a strength member and are surrounded by a jacket of the second sub-assembly element.

10. The hybrid cable of claim 9, wherein at least six of the greater-capacity electrical-conductor elements are round in cross-section and have a diameter that is within 5% of the diameter of the jacket of the second sub-assembly element.

11. A hybrid cable, comprising:
  a cable jacket; and
  elements stranded within the cable jacket, wherein the elements comprise:
    one or more fiber-optic elements comprising stranded buffer tubes of optical fibers within a polymeric jacket; and
    electrical-conductor elements comprising a metallic conductor jacketed in a polymer, wherein the electrical-conductor elements comprise greater-capacity electrical-conductor elements and lesser-capacity electrical-conductor elements, wherein the lesser-capacity electrical-conductor elements are stranded and spiral within a circle defined by the outermost edge of the spiral, and wherein the greater-capacity electrical-conductor elements are round and wherein the diameter of the circle defined by the outermost edge of the spiral is within 15% of the diameter of the largest one of the greater-capacity electrical-conductor elements; and
  wherein at least six of the elements are stranded around a central element; and
  wherein the at least six of the elements are round in cross-section and have a diameter that is within 15% of the diameter of the largest one of the diameters of the at least six of the elements.

12. The hybrid cable of claim 11, wherein the fiber-optic element comprises a combination of at least three polymeric tubes and filler rods stranded together.

13. The hybrid cable of claim 12, wherein the polymeric tubes of the fiber-optic element are stranded about a central strength member and are surrounded by a jacket of the fiber-optic element.

14. The hybrid cable of claim 13, wherein at least six of the electrical-conductor elements are round in cross-section and have a diameter that is within 5% of the diameter of the jacket of the second sub-assembly element.

15. The hybrid cable of claim 13, the cable comprises a first layer and a second layer of elements, wherein the second layer is stranded around the first layer.

16. The hybrid cable of claim 15, wherein the fiber-optic element is in the second layer.

17. The hybrid cable of claim 13, wherein the greater-capacity electrical-conductor elements are each within the range of 10 American wire gauge (AWG) to 1\0 AWG.

18. The hybrid cable of claim 17, wherein the lesser-capacity electrical-conductor elements each have a lesser current-carrying capacity than 10 AWG.

19. The hybrid cable of claim 18, wherein the lesser-capacity electrical-conductor elements are each within the range of 12 to 24 AWG.

20. The hybrid cable of claim 19, wherein the lesser-capacity electrical-conductor elements are each 18 AWG.

* * * * *